(12) United States Patent
Nakashima

(10) Patent No.: US 7,303,478 B2
(45) Date of Patent: Dec. 4, 2007

(54) POWER TRANSMISSION MECHANISM CAPABLE OF PREVENTING BREAKAGE OF A ROTATING SHAFT

(75) Inventor: Masafumi Nakashima, Anjou (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 11/016,897

(22) Filed: Dec. 21, 2004

(65) Prior Publication Data

US 2005/0141959 A1    Jun. 30, 2005

(30) Foreign Application Priority Data

Dec. 24, 2003    (JP) .............................. 2003-427253

(51) Int. Cl.
*F16D 7/02*    (2006.01)

(52) U.S. Cl. .......................... 464/45; 474/70

(58) Field of Classification Search .................. 464/32, 464/45, 182; 403/1, 2, 343; 474/90, 903, 474/70; 411/534, 546; 417/223, 319
See application file for complete search history.

(56) References Cited

U.S. PATENT DOCUMENTS

| | | | | |
|---|---|---|---|---|
| 3,756,325 A | * | 9/1973 | Rucinski | 464/45 X |
| 5,085,536 A | * | 2/1992 | Pelton | 403/343 |
| 5,799,766 A | * | 9/1998 | Link et al. | |
| 6,530,715 B1 | * | 3/2003 | Kraft et al. | 464/182 X |
| 7,014,564 B2 | * | 3/2006 | Nakashima | 464/32 |
| 7,125,191 B2 | * | 10/2006 | Murase et al. | 403/1 |
| 2003/0017909 A1 | | 1/2003 | Murase et al. | |
| 2004/0176200 A1 | * | 9/2004 | Nosaka et al. | 474/70 X |
| 2006/0089224 A1 | * | 4/2006 | Nosaka et al. | 474/70 X |

FOREIGN PATENT DOCUMENTS

JP    A-2001-173759    6/2001
JP    A-2003-35255    2/2003

* cited by examiner

*Primary Examiner*—Greg Binda
(74) *Attorney, Agent, or Firm*—Posz Law Group, PLC

(57) ABSTRACT

In order to transmit a torque from a hub 5 (rotating body) integrally formed together with a pulley 4 to, for example, a sleeve 6 inserted under pressure into a rotating shaft 1 of a refrigerant compressor 2, end surfaces 5e and 6a, which act as a bearing surface, are brought into frictional contact with each other. An axial pressing force is generated by the engagement of screws 1a and 5d of the rotating shaft 1 and the hub 5. An annular cut-out part 7, etc., is provided to form an annular space 10 in a part of the bearing surface around the rotating shaft 1. Thereby, the equivalent diameter of the bearing surface is increased, a slip is more unlikely to occur on the bearing surface, and it is therefore no longer necessary to apply an excessive pressing force to obtain a large friction torque.

5 Claims, 4 Drawing Sheets

POWER TRANSMISSION MECHANISM CAPABLE OF PREVENTING BREAKAGE OF A ROTATING SHAFT

BACKGROUND OF THE INVENTION

1. Field of the Invention

The present invention relates to a power transmission mechanism provided in order to absorb, buffer, or cut off an excessive torque when the torque is transmitted. More particularly, the present invention relates to a power transmission mechanism suitably used as a part that transmits torque from a pulley to the rotating shaft of a refrigerant compressor in a belt transmission device for rotatably driving a refrigerant compressor of an air conditioner for a vehicle.

2. Description of the Related Art

A prior art reference relating to this type of power transmission mechanism is Japanese Unexamined Patent Publication (Kokai) No. 2003-35255 (JP 2003-35255). Important parts of a power transmission mechanism described in (JP 2003-35255) are shown in FIG. 3. There may be a case where the general configuration except the important parts is similar to that according to the prior art described in (JP 2003-35255), when a concrete embodiment of a power transmission mechanism according to the present invention is described in detail later. The prior art is described here with reference to FIG. 3.

In FIG. 3, reference numeral 1P denotes a rotating shaft of a refrigerant compressor, which is rotatably driven by a pulley (not shown) on an engine via a belt. A hub 5P is attached to a driven pulley (not shown in FIG. 3). A part of the hub 5P makes up a so-called torque limiter and the whole of the hub 5P is made of a sintered metal, and an outer part (not shown in FIG. 3) and an inner part of the hub 5P are connected by a spoke-shaped narrow part (not shown) that breaks readily. On the inner surface of a cylindrical part 5Pc of the hub 5P integrally formed together with the inner part 5Pc, a female screw 5Pd is formed and is screwed into a male screw 1Pa formed on the outer surface at the end of the rotating shaft 1P. The direction of pitch of the screws 1Pa and 5Pd is formed such that the cylindrical part 5Pc is screwed and moves in the rightward direction in the figure along the rotating shaft 1P, by turning the driven pulley and the hub 5P in a direction in which they rotatably drive the rotating shaft 1P of the refrigerant compressor in a predetermined direction of rotation, assuming the rotating shaft 1P stays still.

The rotating shaft 1P is provided with a sleeve 6P attached thereto by means of insertion under pressure and a flat end surface 6Pa of the sleeve 6P is in contact with a flat end surface 5Pe of the cylindrical part 5Pc of the hub 5P. In addition, a tapered surface 6Pb formed on a part of the inner surface of the sleeve 6P is in contact with a tapered surface 1Pb formed on a part of the rotating shaft 1P. The prior art described in (JP 2003-35255) is characterized in that torque can be transmitted without fail between the hub 5P and the rotating shaft 1P, because it is possible to increase the area of a bearing surface (the tapered surfaces 1Pb and 6Pb, or the flat end surfaces 5Pe and 6Pa) interposed between the hub 5P and the rotating shaft 1P by attaching the sleeve 6P to the rotating shaft 1P without increasing the diameter of the rotating shaft, therefore, buckling (collapsing under pressure) is more unlikely to occur on these bearing surfaces.

When the sleeve 6P is firmly integrated with the rotating shaft 1P by means of insertion under pressure, torque is transmitted from the sleeve 6P to the rotating shaft 1P without fail by means of both a pressure-contact part at which the inner surface of the sleeve 6P and the outer surface of the rotating shaft 1P, which is inserted with pressure thereinto, are pressed to come into contact with each other, and the part at which the tapered surfaces 1Pb and 6Pb, which are pressed against each other as one of the bearing surfaces, come into contact with each other. However, the magnitude of the torque transmitted, prior to the above-mentioned transmission, from the cylindrical part 5Pc of the hub 5P to the sleeve 6P, is determined depending on the degree of slip between the flat end surfaces 5Pe and 6Pa, each of which is a bearing surface with respect to the other end surface. In the case where a slip occurs, if the torque is increased, a screw-tightening force acting between the screws 1Pa and 5Pd is increased and the slip in the direction of rotation between the end surfaces 5Pe and 6Pa is also increased and, therefore, the hub 5P slightly moves along the rotating shaft 1P in the axial direction to the right in the figure because the female screw 5Pd rotates relatively with respect to the male screw 1Pa. Due to this, the tensile force in the axial direction at the root part of the male screw 1Pa is increased locally and, thus, the possibility is brought about that the rotating shaft 1P may be broken.

SUMMARY OF THE INVENTION

The above-mentioned problems being taken into account, an object of the present invention is to provide an improved power transmission mechanism capable of: preventing breakage of a rotating shaft from occurring, which might occur in the worst-case scenario; and transmitting without fail a greater torque than before from a rotating body such as a hub to the rotating shaft by: preventing a slip that occurs on the bearing surface consisting of the end surface of the rotating body such as, in general, a hub, and the end surface of a sleeve that comes into contact therewith or a part on the rotating shaft side, corresponding to the sleeve; and by preventing an excess tensile force from acting on the root of a male screw of the rotating shaft.

In order to prevent the worst-case breakage of the rotating shaft, it is necessary to prevent a slip in the direction of rotation on the bearing surface between the hub (the rotating body) side and a sleeve, etc., on the rotating shaft side. To achieve this, the friction torque on the bearing surface must be increased in order to make it more difficult for a slip to occur. In order to increase the friction torque on the bearing surface, it is necessary to increase the axial force acting on the bearing surface, or to increase the coefficient of friction of the bearing surface, or to increase the effective diameter of the bearing surface. However, each of these methods brings about a problem. Because of this, in the present invention, a method that brings about a relatively less serious problem, that is, the last method, in which the effective diameter of the bearing surface is increased while an increase in size as a whole is being prevented, is employed. To be specific, the present invention provides a power transmission mechanism. In other words, the present invention is characterized in that an annular space is formed around a rotating shaft in the power transmission mechanism described in JP 2003-35255, in order to form a part, near the center on at least one of two end surfaces in frictional contact with each other, which does not come into contact with the end surface and does not act as a bearing surface.

As the power transmission mechanism of the present invention has the above-mentioned configuration characteristics, it is possible to increase the value of the equivalent diameter of the part in frictional contact between the bearing surfaces of the rotating body side and the rotating shaft side without the need to increase the size of the power transmission mechanism. As the equivalent diameter is increased, the friction torque is also increased in proportion thereto. Because of this, a slip is more unlikely to occur between the bearing surfaces and an excess tensile force can be prevented from acting on the root part of the male screw of the rotating shaft and, therefore, it becomes possible to prevent the worst-case breakage of the rotating shaft and to transmit without fail a greater torque than before between the rotating body and the rotating shaft.

According to the present invention, as an end surface is formed as a bearing surface on the rotating shaft side, it is possible, as in the prior art, to easily manufacture a power transmission mechanism having the characteristics of the present invention by attaching a sleeve, which is provided separately, to the rotating shaft having a relatively small diameter by mean of, for example, insertion under pressure.

As described above, the present invention is characterized in that an annular space is formed around a rotating shaft in order to form a part, near the center on at least one of two end surfaces in friction contact with each other, which does not come into contact with the end surface and does not act as a bearing surface. Specific means for forming an annular space include a means for forming an annular cut-out part on either side of the rotating body or the rotating shaft, a means for forming annular cut-out parts, in opposition to each other, on both sides of the rotating body and the rotating shaft, and a means for interposing an annular shim having an inner diameter greater than the outer diameter of the rotating shaft between end surfaces, in opposition to each other, on both sides of the rotating body and the rotating shaft.

The present invention may be more fully understood from the description of the preferred embodiments of the invention set forth below, together with the accompanying drawings.

DETAILED DESCRIPTION OF THE PREFERRED EMBODIMENTS

Figure 1:
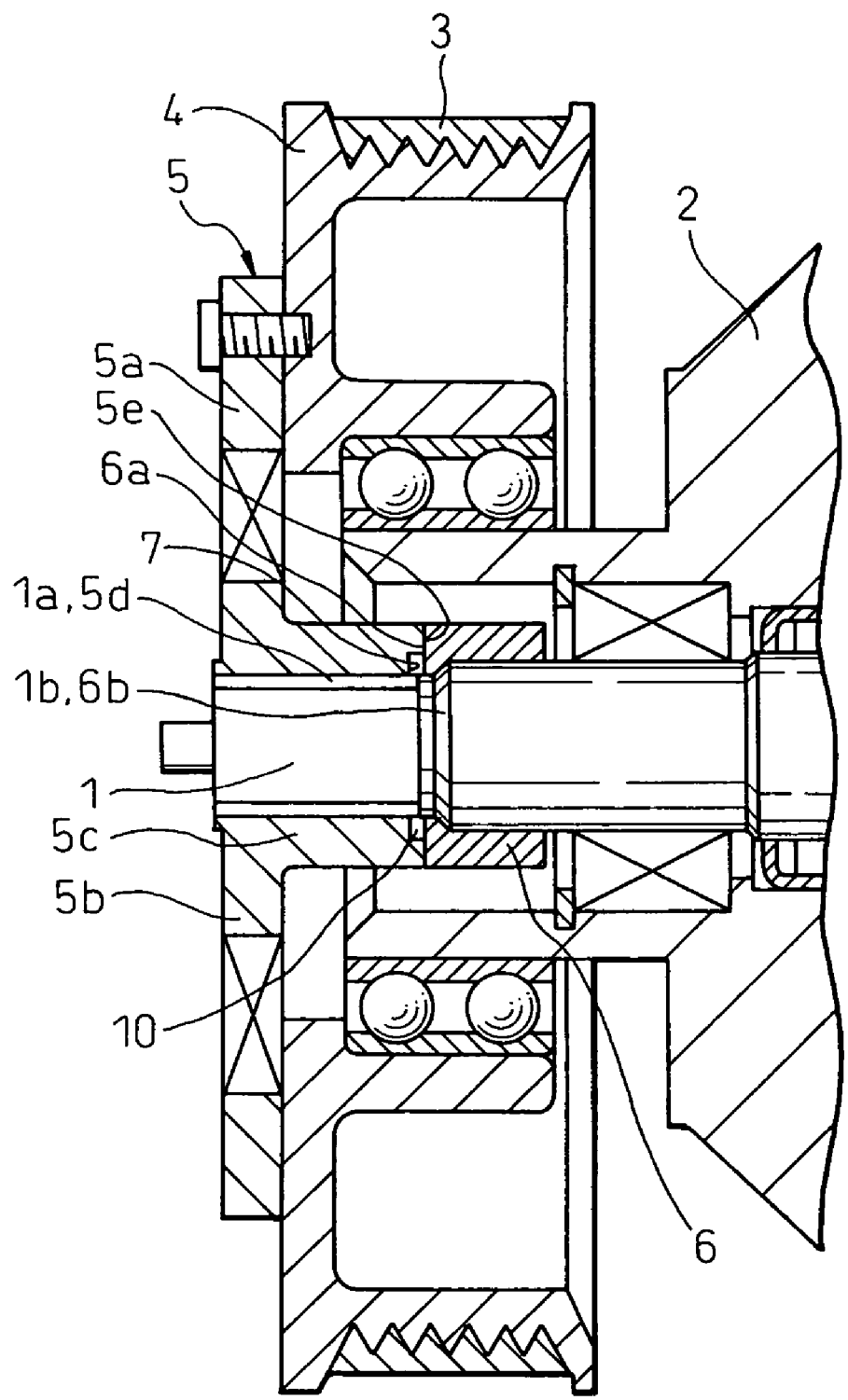
FIG. 1 is a longitudinal sectional view showing the general configuration of a power transmission mechanism in an embodiment of the present invention and in a conventional example.
Figure 2:
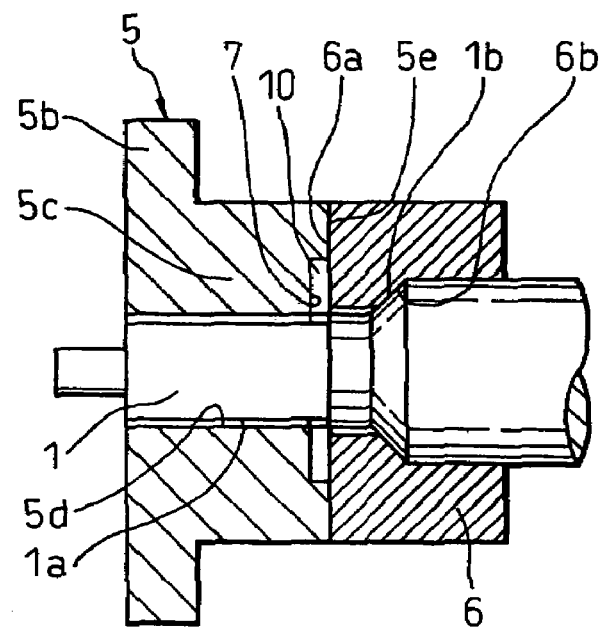
FIG. 2 is a longitudinal sectional view showing important parts in a first embodiment of the present invention.

A first embodiment of the present invention is explained below with reference to FIG. 1 and FIG. 2. FIG. 1 shows the general configuration common to the above-mentioned prior art and FIG. 2 is an enlarged view of only characteristic parts (important parts) in the first embodiment of the present invention. Concerning the details of the parts, shown in FIG. 1, that are common to the prior art, the explanation of the prior art described above also applies here.

In FIG. 1 and FIG. 2, reference numeral 1 denotes the rotating shaft of the refrigerant compressor 2, 1a denotes a male screw formed on the end part of the rotating shaft 1, and 1b denotes a tapered surface formed on a part of the rotating shaft 1. Reference numeral 3 denotes a belt that transmits a torque from, for example, a vehicle engine (not shown) to a pulley 4. Reference numeral 5 denotes a hub (in general, a rotating body) attached to the pulley 4 with bolts, or the like. An outer part 5a and an inner part 5b of the hub 5 are coupled by a spoke-like part (not shown) that breaks readily and, therefore, the hub 5 is provided with a function of a torque limiter that breaks in order to protect the parts concerned when the torque transmitted by the spoke-like part becomes extremely great. The hub 5 has the end surface 5e that is flat in the axial direction.

A cylindrical part 5c is formed integrally with the inner part 5b of the hub 5 and the inner surface thereof is provided with a female screw 5d. The female screw 5d is screwed into by a male screw 1a of the rotating shaft 1. Reference numeral 6 denotes a sleeve attached to the rotating shaft 1 by mean of insertion under pressure, and comprises a flat end surface 6a at one and in the axial direction, which comes into contact with an end surface 5e of a cylindrical part 5c of the hub 5 and a tapered surface 6b on the inner surface thereof, which corresponds to and is inserted into a tapered surface 1b of the rotating shaft 1. The configuration described above is similar to that of the power transmission mechanism according to the above-mentioned prior art.

Figure 3:
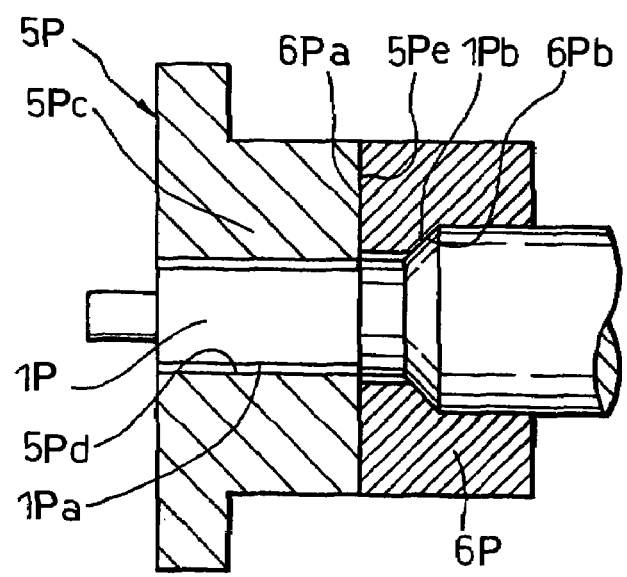
FIG. 3 is a longitudinal sectional view showing important parts in the conventional example.

As is obvious from the comparison between FIG. 2, in which characteristic parts of the first embodiment are enlarged and shown, and FIG. 3, in which parts corresponding to the prior art are shown, the first embodiment of the present invention is distinguished from the above-mentioned prior art and characterized in that an annular cut-out part 7 is provided by applying a spot-facing process to a part near the center on the end surface 5e of the cylindrical part 5c of the hub 5, which comes into contact with the end surface 6a of the sleeve 6 in the axial direction thereof, so that a space 10 is formed around the rotating shaft 1. In the first embodiment, the formation of the cut-out part 7 somewhat decreases the area of the bearing surface (the contact surface) between the end surfaces 5e and 6a, but, as will be described later, the equivalent diameter, which is an average value of the diameter of the bearing surface becomes greater than that of the prior art shown in FIG. 3 because the part near the center, at which the diameter is small, is cut out by a spot-facing process.

When the value of a friction torque at the bearing surface between the end surfaces 5e and 6a, that is, a limit torque, is denoted by T, which is defined in such a manner that if a torque applied between the cylindrical part 5c of the hub 5 and the sleeve 6 exceeds the limit torque, a slip occurs on the bearing surface, the equivalent diameter of the bearing surface is denoted by dm, the coefficient of friction of the bearing surface is denoted by μ, and a tightening force between the rotating shaft 1 and the hub 5 by the screws 1a and 5d, that is, an axial pressing force applied to the bearing surface, is denoted by P, then the value of the friction torque T is obtained by the following formula.

$$T = dm \cdot \mu \cdot P / 2 \qquad (1)$$

As obvious from the formula (1), irrespective of the area of the bearing surface, the greater the equivalent diameter dm, the greater the value of the friction torque T becomes, and slip becomes more unlikely to occur on the bearing surface.

When the outer diameter of the bearing surface, which is a contact surface between the end surfaces 5e and 6a, is denoted by do and the inner diameter of the bearing surface determined by the spot-facing is denoted by di, then the value of the equivalent diameter dm can be calculated from the following definition formula (2)

$$dm = 2(do^3 - di^3)/3(do^2 - di^2) \quad (2)$$

Figure 4:
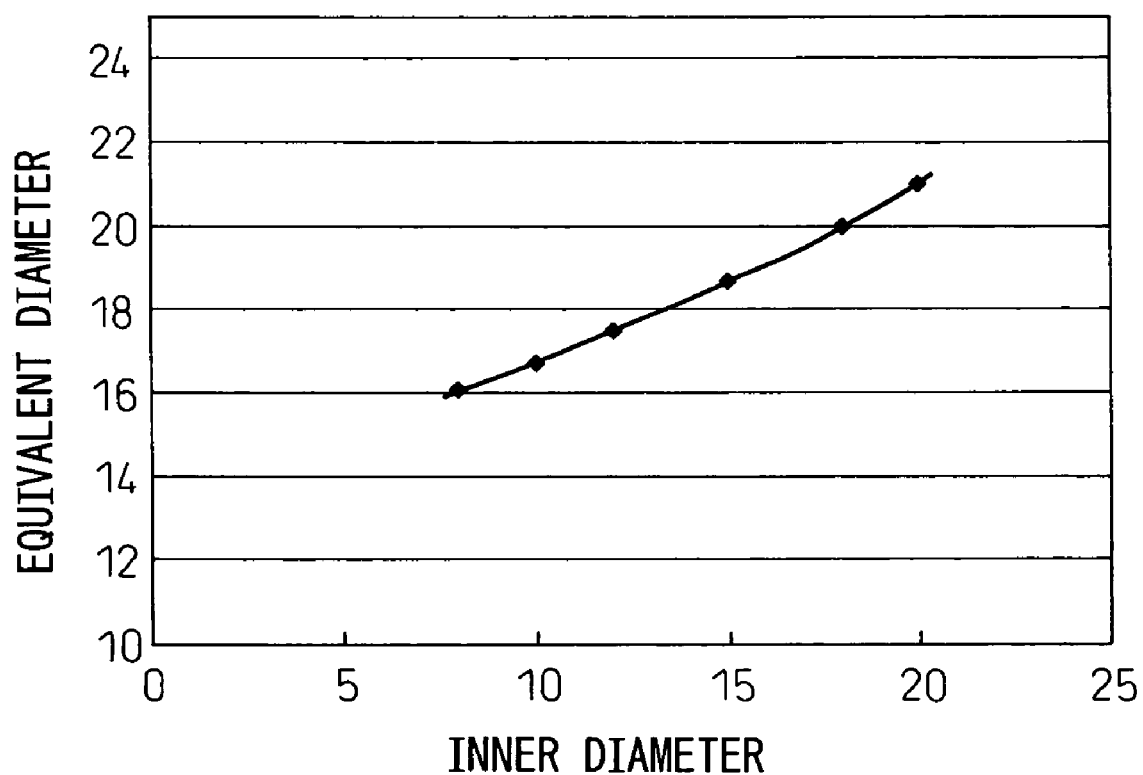
FIG. 4 is a graph showing a relationship between the spot-facing diameter and the equivalent diameter.

As is obvious from the formula (2), if the outer diameter do of the bearing surface is kept constant and the inner diameter di is increased by increasing only the diameter of the cut-out part 7 by a spot-facing process, the equivalent diameter is also increased. For example, when the outer diameter do is 22 mm, the relationship between the inner diameter di and the equivalent diameter dm is almost linear as shown by the graph in FIG. 4, and the greater the inner diameter di becomes, the greater the value of the equivalent diameter dm becomes. It is obvious that the inner diameter di cannot exceed the outer diameter do.

The equivalent diameter is a numerical value generally used when the tightening force of a screw or the like is calculated, and corresponds to the diameter of a thin annular part in the bearing surface on which the friction force is concentrated. Approximately, the arithmetic average of the outer diameter do and the inner diameter di can be used instead of the equivalent diameter dm and in this case, no significant error is caused. Therefore, actually, the following formula (3) that makes calculation easier can be used instead of the formula (2).

$$dm \approx (do + di)/2 \quad (3)$$

As described above, if, on the end surface 5e of the cylindrical part 5c of the hub 5, which comes into contact with the axial end surface 6a of the sleeve 6, the annular cut-out part 7 is formed in a part near the center by spot-facing process and, at the same time, the inner diameter di is increased by increasing the diameter of the cut-out part 7, the equivalent diameter dm is also increased and, therefore, as is obvious from the relationship between the equivalent diameter dm and the friction torque Nm expressed by the formula (1), the value of the friction torque Nm is also increased linearly in proportion to the equivalent diameter dm and a slip becomes more unlikely to occur on the contact surface between the end surfaces 5e and 6a, which are the bearing surfaces.

In this case, as there is no relationship between the area of the bearing surface and the magnitude of the friction torque, the value of the friction torque is unlikely to decrease even if the area of the bearing surface is somewhat reduced because the inner diameter di is increased. However, if the area of the bearing surface becomes extremely small, there arises the possibility that the bearing surface buckles (collapses under pressure) due to an axial pressing force, therefore, although the inner diameter di may be increased, the size of the inner diameter di itself naturally has a limit, and an area that can at least prevent the bearing surface from buckling is required.

Figure 5:
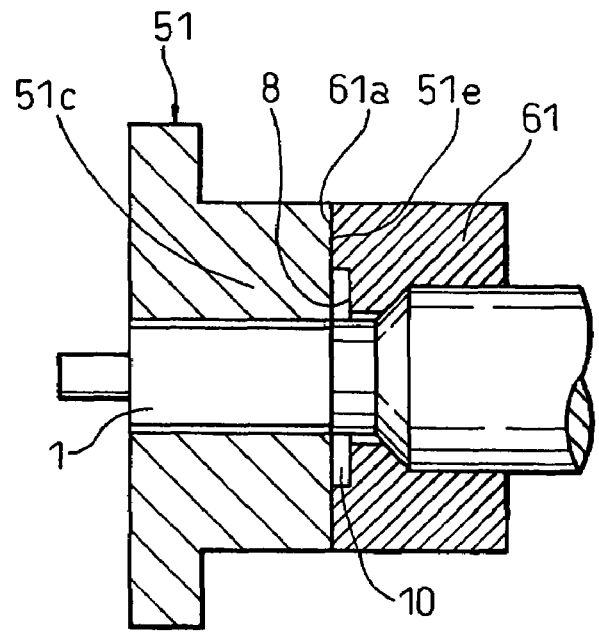
FIG. 5 is a longitudinal sectional view showing important parts in a second embodiment of the present invention.

Important parts of a power transmission mechanism according to a second embodiment of the present invention are shown in FIG. 5. In the first embodiment, the annular cut-out part 7 is formed in the end surface 5e of the cylindrical part 5c of the hub 5 by a spot-facing process. The second embodiment of FIG. 5 includes a hub 51, a cylindrical part 51c, an end surface 51e, a sleeve 61, a sleeve end surface 61a, which correspond to the hub 5, the cylindrical part 5c, the end surface 5e the sleeve 6, and the sleeve end surface 6a of the first embodiment of FIG. 2, respectively.

The second embodiment is characterized in that an annular cut-out part 8 is formed in the end surface 61a of the sleeve 61, which is the bearing surface of the opposite side of the end surface 51e, and thus a space 10 is formed. In this case also, the same functions and effects as those in the first embodiment can be obtained.

Figure 6:
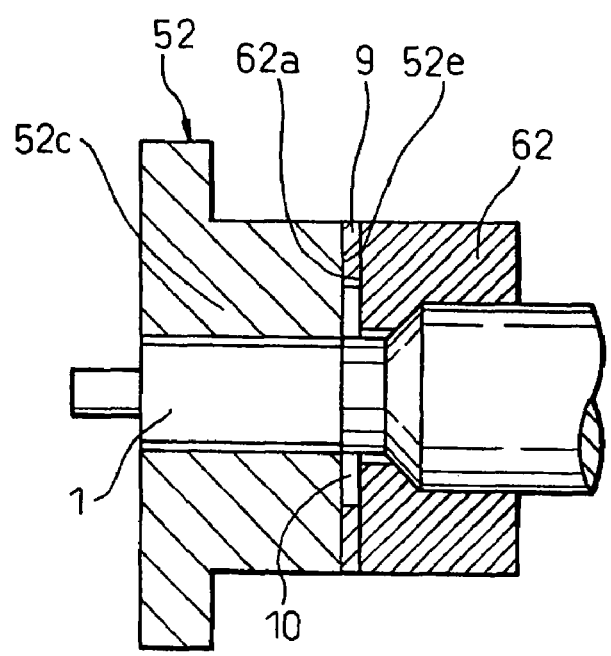
FIG. 6 is a longitudinal sectional view showing important parts in a third embodiment of the prevent invention.

FIG. 6 shows a third embodiment of the present invention. The third embodiment includes a hub 52, a cylindrical part 52c, an end surface 52e, a sleeve 62, a sleeve end surface 62a, which correspond to the hub 5, the cylindrical part 5c, the end surface 5e the sleeve 6, and the sleeve end surface 6a of the first embodiment of FIG. 2, respectively. In this case, the cut-out part is provided neither in the end surface 52e of the hub 52 nor in the end surface 62a of the sleeve 62. Instead, the end surfaces 52e and 62a are simply made into flat end surfaces and, at the same time, an annular shim 9 having an inner diameter greater than the outer diameter of the rotating shaft 1 is interposed between the end surfaces 52e and 62a, so that the space 10 is formed at the central part. The above configuration is characteristic of the third embodiment. As it is necessary for the shim 9 to maintain a concentric relationship with the rotating shaft 1, a proper means must be provided to maintain the relationship. In the proper means, for example, a plurality of short pins protrude axially from one of the end surfaces 52e and 62a, a plurality of holes corresponding to the pins are formed in the shim 9, and the respective pins are engaged with the respective corresponding holes. In this case, the inner diameter of the shim 9 can act as similarly as the inner diameter di of the annular cut-out part 7 or 8 provided in the end surfaces 5e and 6a in the first embodiment or the end surfaces 51e and 61a of the second embodiment and, therefore, substantially the same functions and effects as those in the first and second embodiments can be obtained.

Moreover, in each of the embodiments described above, the sleeve 6, 61, 62 is fixed on the rotating shaft 1 by means of insertion with pressure, but it is needless to say that a part corresponding to the sleeve 6, 61, 62 in each of the embodiments may be integrally formed together with the rotating shaft 1 at the initial stage. In this case also, the same functions and effects as those in each of the embodiments described above can be obtained and, at the same time, additional effects that the number of parts is reduced, the machining process is simplified, etc., can also be obtained, resulting in a reduction in cost. Moreover, in each of the first two embodiments, the annular cut-out part 7 or 8 is provided in either the end surface 5e, 51e of the hub 5, 51 or the end surface 6a, 61a of the sleeve 6, 61, but it is also possible to form the space 10 by providing the cut-out parts in both end surfaces 5e, 51e and 6a, 61a so as to face each other.

The power transmission mechanism according to the present invention can be used, for example, for rotatably driving a refrigerant compressor in an air-conditioner mounted on a vehicle using an engine for a vehicle. Particularly, when a so-called super-critical fluid, such as carbon dioxide, which does not liquefy readily even if it is compressed to a high pressure, is used as a refrigerant, the power transmission according to the present invention is suitable for use under severe operating conditions.

What is claimed is:
1. A power transmission mechanism for transmitting a torque to a rotating shaft of a compressor of an air conditioner for a vehicle comprising:
   a rotating body having a female screw formed in a center thereof;

a rotating shaft having a male screw formed on a part of an outer surface thereof and thereby being screwed into the rotating body;

a pulley rotatably supported by a bearing on an outer surface of a housing of the compressor;

a torque limiter located between the rotating body and the pulley, wherein the torque limiter transmits torque from the pulley to the rotating body;

an end surface, in an axial direction, formed on the rotating body side as a bearing surface for transmitting a torque between the rotating body and the rotating shaft by being pressed against a bearing surface of an opposite rotating shaft side by action of the female screw and the male screw and by being brought into frictional contact therewith, and for preventing the male screw from being screwed excessively into the female screw; and an end surface, in an axial direction, formed on the rotating shaft side as the bearing surface for the same purpose, corresponding to the end surface on the rotating body side and for mating therewith; wherein the two end surfaces are arranged in opposite positions to each other; and an annular space is formed around the rotating shaft in order to form a part, near a center of at least one of the two end surfaces in frictional contact with each other, which does not come into contact with the other end surface and does not act as a bearing surface.

2. The power transmission mechanism as set forth in claim 1, wherein a separately-provided sleeve is attached to the rotating shaft in order to form the end surface, as the bearing surface, on the rotating shaft side.

3. The power transmission mechanism as set forth in claim 2, wherein the rotating shaft comprises a tapered surface and a position of the sleeve is determined by the tapered surface.

4. The power transmission mechanism as set forth in claim 1, wherein the annular space is formed by an annular cut-out part formed on either side of the rotating body or the rotating shaft.

5. The power transmission mechanism for transmitting a torque to a rotating shaft of a compressor of an air conditioner for a vehicle comprising:

a rotating body having a female screw formed in a center thereof;

a rotating shaft having a male screw formed on a part of an outer surface thereof and thereby being screwed into the rotating body;

a pulley rotatably supported by a bearing on an outer surface of a housing of the compressor;

a torque limiter located between the rotating body and the pulley, wherein the torque limiter transmits torque from the pulley to the rotating body;

an end surface, in an axial direction, formed on the rotating body side as a bearing surface for transmitting a torque between the rotating body and the rotating shaft by being pressed against a bearing surface of an opposite rotating shaft side by action of the female screw and the male screw and by being connected to the bearing surface via an annular shim, and for preventing the male screw from being screwed excessively into the female screw; and an end surface, in an axial direction, formed on the rotating shaft side as the bearing surface for the same purpose, corresponding to the end surface on the rotating body side and for mating therewith; wherein the two end surfaces are arranged in opposite positions to each other; and an annular space is formed around the rotating shaft in order to form a part, near a center of at least one of the two end surfaces in frictional contact with each other, which does not come into contact with the other end surface and does not act as a bearing surface, and the annular space is formed by locating the annular shim, which has an inner diameter greater than the outer diameter of the rotating shaft, between the end surfaces in opposition to each other on both sides of the rotating body and the rotating shaft.

\* \* \* \* \*